United States Patent [19]

Everett

[11] 4,375,684

[45] Mar. 1, 1983

[54] LASER MODE LOCKING, Q-SWITCHING AND DUMPING SYSTEM

[75] Inventor: Patrick N. Everett, Concord, Mass.

[73] Assignee: Jersey Nuclear-Avco Isotopes, Inc., Bellevue, Wash.

[21] Appl. No.: 172,967

[22] Filed: Jul. 28, 1980

[51] Int. Cl.³ ............................................. H01S 3/098
[52] U.S. Cl. ...................................... 372/18; 372/12; 372/20
[58] Field of Search ....................... 372/18, 12, 13, 17, 372/26, 29, 106, 97, 10

[56] References Cited

U.S. PATENT DOCUMENTS

| | | | |
|---|---|---|---|
| 3,673,504 | 6/1972 | Hilberg | 372/10 |
| 3,766,393 | 10/1973 | Herzog et al. | 372/26 |
| 3,995,231 | 9/1976 | Johnson et al. | 372/18 |
| 4,019,156 | 4/1977 | Fountain et al. | 372/18 |
| 4,024,466 | 5/1977 | Cremosnik | 372/26 |
| 4,176,327 | 9/1979 | Wayne et al. | 372/18 |

Primary Examiner—William L. Sikes
Assistant Examiner—Léon Scott
Attorney, Agent, or Firm—Weingarten, Schurgin, Gagnebin & Hayes

[57] ABSTRACT

A single element interposed in a laser resonator cavity provides for AM mode-locking, Q-switching and dumping in a sequential operation in which a Pockels cell or like polarization rotation device is first energized to prevent build-up of radiation in a laser cavity, is then switched to provide for mode-locking by energization with a periodically varying signal, and is finally energized to dump a single mode-locked pulse. The sequential operation permits the use of a single electro-optic element and a single pair of electrodes. Q-switching, mode-locking and dumping are accomplished utilizing the same physical effect in the crystal, e.g., polarization rotation.

10 Claims, 4 Drawing Figures

LASER MODE LOCKING, Q-SWITCHING AND DUMPING SYSTEM

FIELD OF INVENTION

This invention relates to laser systems and more particularly to a method and apparatus for effectuating mode-locking, Q-switching and dumping with a single electro-optic device and a single physical effect.

BACKGROUND OF THE INVENTION

Mode-locking and dumping, or mode-locking and Q-switching has more commonly been accomplished in the past with a plurality of elements rather than a single element. A mode-locked/cavity dump laser using separate elements is illustrated in U.S. Pat. No. 3,995,231 issued to Richard Howard Johsnon et al. on Nov. 30, 1976. A mode-locked/Q-switched laser using separate elements is described in U.S. Pat. No. 4,019,156 issued to William D. Fountain, et al. on Apr. 19, 1977.

In the past, cavity dumping has involved the technique of inducing birefringence in an electro-optic crystal so as to divert a pulse traveling in the laser cavity out of the cavity. In this technique, a beam traversing the laser cavity is first linearly polarized with a Brewster window, for example. A pair of electrodes placed on the electro-optic crystal, which is disposed within the laser cavity, allows an electric field to be applied, which induces a birefringence in the crystal. Induced birefringence means that the crystal is made double-refracting. When linearly polarized light passes through a birefringant crystal, the transmitted beam can become elliptically polarized. If a second polarization selective element is placed in the laser cavity, it will reflect out of the cavity a fraction of the elliptically polarized beam. This causes part of the pulse to be coupled out or dumped from the laser cavity. Such an arrangement is disclosed, for example, in U.S. Pat. No. 3,508,164 to Uchida.

The same technique for dumping can be utilized for Q-switching to prevent build up in a laser cavity. Polarization rotation for Q-switching is a standard technique in which, with a polarization element within the laser cavity, light which is originally linearly polarized, when rotated 90 degrees may be prevented from propagating back and forth in the laser cavity.

In U.S. Pat. No. 3,935,543 issued to Eguchi et al. on Jan. 27, 1976, two different physical effects are utilized in a single element. One is polarization rotation and the other is a change of the refractive index of the crystalline material. These two phenomena are utilized by energizing the material with two different sets of electrodes and therefore the effects produced by the above-mentioned patent are independent.

More recently, a single electro-optic element and a single phenomenon has been used for Q-switching followed by mode-locking. This is reported in the Laser Program Annular Report-1974; UCRL-50021-74, pps. 128-132. In this article a Pockels cell is first utilized to provide Q-switching and then 100% loss modulation is used in synchronization with the pulse round trip time in the cavity. Here no cavity dumping is mentioned.

MODE LOCKING

Since the subject invention involves mode-locking, it is important to distinguish AM mode-locking from FM mode-locking. In order to understand the difference between AM mode-locking and FM mode-locking, it should be noted that the frequencies of the axial modes of the laser cavity are determined by the condition that an integer number of optical half wave lengths must fit into the cavity length L, so that the frequency difference is $c/2L$, where c is the velocity of light. Mode-locking is a process by which the axial modes of the laser cavity can be induced to oscillate with their phases "locked" together in such a way that the optical field in the laser consists of a single pulse traveling back and forth in the cavity. Aside from spontaneous or passive locking, which can sometimes occur due to nonlinear interactions in the laser gain medium, there are two basic active methods for achieving laser mode-locking. Both require the introduction into the laser cavity of a time varying perturbation, with the frequency of the perturbation tuned near a value that is an integer multiple of the laser axial mode difference frequency. Only modes which have sufficient gain in the laser medium to overcome the losses in the laser cavity will be able to oscillate. It is only these modes, and perhaps some whose gain is slightly below the threshold for oscillation, that can be driven to oscillate with their phases locked together to form a sharp optical pulse in active mode-locking schemes.

The first type of active mode-locking technique is AM mode-locking or loss-locking, since it involves an amplitude modulation of the optical mode. This form of mode-locking is achieved by the introduction of a time-varying loss into the laser cavity, and for simplicity, this loss could be imagined to be a very fast shutter which is being opened and closed with a frequency equal to the axial mode frequency difference. Since this frequency difference, which is $c/2L$, corresponds to the frequency at which light can traverse a round-trip of the cavity, only an optical pulse timed to coincide to when the shutter is open can build up in the laser. In general, a wide variety of methods can be employed to introduce a time varying amplitude perturbation mechanism into the laser cavity, in order to induce a locking of the phases of the modes in such a way that an optical pulse is produced that travels back and forth in the cavity to coincide with the times when the loss is minimized. For example, AM locking can be achieved by means of an electro-optic crystal. In effect, this arrangement provides for an electro-optic shutter that allows only a pulse with the proper synchronization to build up in the cavity.

The other type of mode-locking is called FM locking, or phase locking. This type of mode-locking can, for example, be achieved by moving one of the mirrors of the laser mechanically back and forth at the axial mode difference frequency. The same effect can be achieved by utilizing an electro-optic crystal and varying its refractive index by means of an applied electric field. An electric field applied to an electro-optic crystal produces a change in the optical index of refraction, and the phase velocity of light in the medium is equal to $c/n$, where c is the velocity of light in a vacuum and n is the index of refraction of the material. Thus, by means of a variable applied electric field, it is possible to modulate the phase velocity of light in the electro-optic material and hence the optical length of the resonator. This modulation results in energy being exchanged between the adjacent modes, and if circumstances are correct, to a locking of the phases of the individual modes. If the voltage is applied at a frequency very near a multiple of the axial mode difference frequency, the locked modes, when transformed into the time-plane, yield a single pulse bouncing back and forth in the cavity similar to that in the Amplitude Locked case. However, this invention makes use of only Amplitude (or loss) Locking, not the FM (or frequency) locking.

SUMMARY OF THE INVENTION

It is a feature of the subject invention that mode-locking, Q-switching and cavity dumping are all accomplished with a single element to provide a single mode-locked pulse. Moreover, a single phenomenon, polarization rotation, is utilized to effect mode-locking, Q-switching and cavity dumping. It is the finding of the subject invention that mode-locking, Q-switching and cavity dumping can be accomplished by sequential actuation of a crystal utilizing a single pair of electrodes. Polarization rotation is first utilized to prevent build-up in the laser cavity. A periodically varying signal is then applied to the same electrodes to induce mode-locking. Finally, polarization rotation is again used to effect cavity dumping.

In operation, the laser is first pumped and the gain medium for the laser is allowed to build up to the required population inversion at which point the stimulated emisson from the build up is allowed to propagate back and forth in the laser cavity so that lasing occurs.

At the point that there is a significant induced population inversion within the gain medium of the laser, the crystal is modulated so as to effectuate mode-locking. The frequency at which the crystal is modulated is equal to c/2L and the operation of the mode-locking is similar to that described for AM mode-locking in the above mentioned patent. The energy that builds up within a mode-locked laser can be represented by a single pulse bouncing back and forth within the cavity. Normally, one mirror of the cavity is partially reflecting, so the output consists of a series of pulses, separated by the round-trip time of the cavity, i.e. 2L/c.

In order to obtain a single pulse output from such a laser, the beam which is propagating within the laser cavity is directed off axis so that it can be extracted. This off axis redirection of the beam is called dumping, and refers to the coupling out of the light pulse from the laser cavity. In order to effectuate the dumping, polarization rotation is utilized such that with a 90 degree rotation in the polarization of the light propagating within the cavity, and with the utilization of a polarization selective element, the 90 degree rotation results in light being reflected away from the primary optical axis of the laser cavity. The laser pulse that is emitted with the subject system is generated through the mode-locking step which occurs just before the dumping step.

Thus it can be seen that by the utilization of the same physical phenomenon a single element may be utilized to effect Q-switching, mode-locking, and dumping.

It is also a feature of the subject invention that complete 90 degree polarization rotation need not be utilized in order to effectuate mode-locking. Thus the light beam propagating backwards and forwards in the laser cavity need not be rotated a full 90 degrees, or to extinction with respect to the polarizing element, in order to effectuate mode-locking. Q-switching and dumping need not require rotation to extinction. However, efficiency of the laser system is significantly degraded unless rotation to extinction is utilized for the Q-switching and the dumping. The purpose of the resonant opening of the shutter, in its mode-locking portion of the cycle, is to allow the single pulse to build up from the noise in the cavity as the result of many successive passes through the amplifying medium and the shutter. In view of the many passes, typically about 50, a relatively small transmission difference between the open and closed states of the shutter can result in almost complete suppression of energy outside of the single pulse. However, it must be recognized that scattering or reflection off any element in the cavity, other than the mirrors, can result in spurious pulses if the switching is not definite enough. In a laser which is free of such reflections, the mode-locking will be established early in the cycle of amplification, and would thereafter build up to the full intensity in subsequent passes even if the periodic modulation were removed. In such a laser the rejected energy that also goes into the output would be of very low intensity. However, if the reflections and scattering are strong, significant energy will be rejected before the "dumped" pulse emerges, and a secondary optical switch may be required external to the cavity to reject the unwanted light that emerges before the major output.

The subject invention applies to both pulse-pumped lasers and continuously pumped ones. In both types there is a pause before its exhausted gain medium can recover the gain as a result of further pumping. During this pause the extinction value of voltage is restored to the modulator to allow the cycle to be repeated.

BRIEF DESCRIPTIONS OF THE DRAWING

These and other features of the present invention will be more fully understood by reference below to the detailed description of preferred embodiment presented for purposes of illustration, and not by way of limitation, and to the accompanying drawings of which:

DETAILED DESCRIPTION

Figure 1:
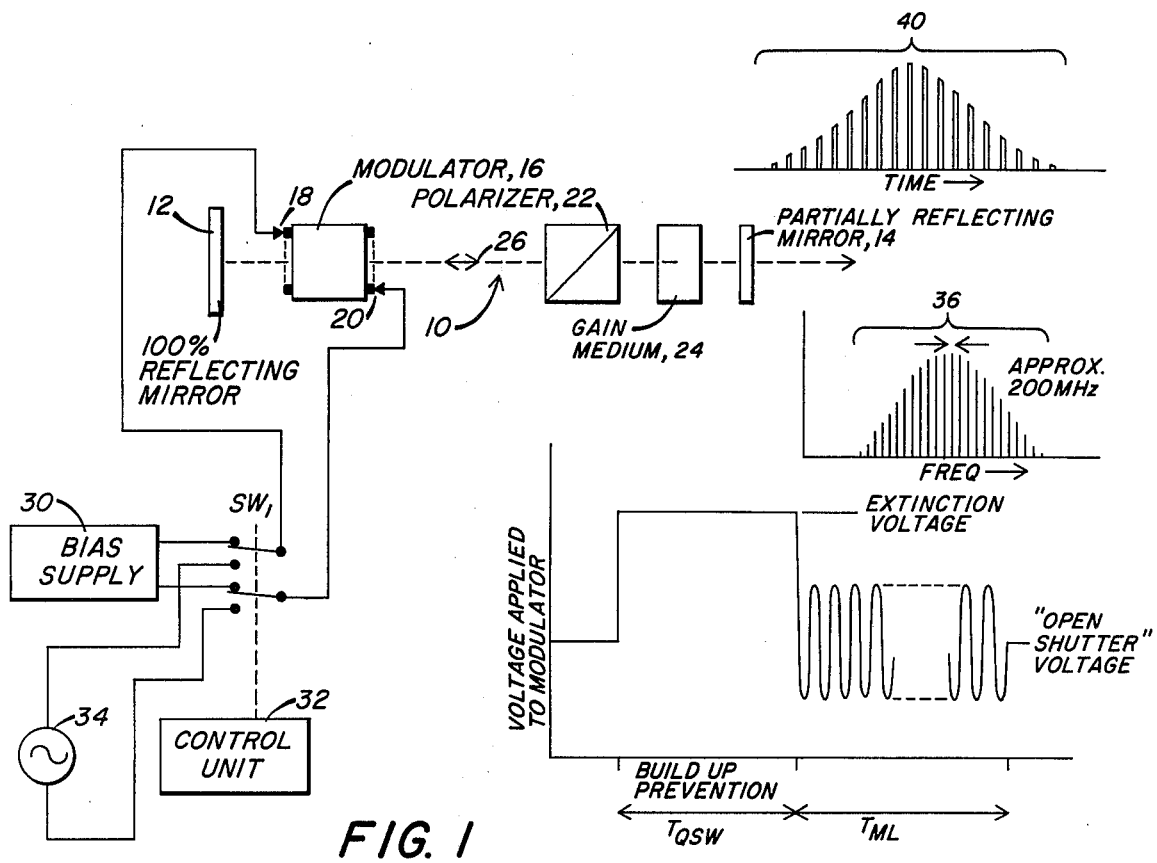
FIG. 1 is a schematic and block diagram illustrating the utilization of a single element for AM mode-locking and Q-switching in which only one physical effect accomplishes both mode-locking and Q-switching.

Referring to FIG. 1, by way of description, a laser cavity 10 may be provided with a 100 percent reflecting mirror 12 at one end and a partially reflecting mirror 14 at its other end. Interposed in the cavity is a modulator 16 which may conveniently be any electro-optic device which rotates the plane of polarization of an incident beam in accordance with the voltage applied across its electrodes 18 and 20. The Pockels cell is such a device. For maximum effectiveness the device should be close to one end of the cavity.

Also, interposed in the laser cavity is a conventional polarizing element 22 and a conventional gain medium 24. Gain medium 24 may be pumped conventionally by a flash lamp (not shown). In one embodiment the polarizing element may include a stack of Brewster plates which, when the gain medium is pumped, polarizes light traveling within cavity 10 in a pre-determined direction. Polarizing element 22 is oriented such that when modulator 16 is actuated fully, light from the modulator rotated 90 degrees is extinguished by the polarizing element. In short, the direction of polarization of polarizing element 22 establishes the initial direction of polarization of light propagating in cavity 10. When this light is rotated by the modulator to an angle 90 degrees from its original angle, this light is extinguished in the sense that the amplitude of light passing through polarizing element 22 in the axial direction is minimized. As will be discussed, polarizing element 22 causes the rotated light to exit at an angle to the axial direction.

The Q-switching apparatus is conventional and not described here. In a schematic sense, Q-switching is accomplished by appling coupling electrodes 18 and 20 through a double pole double throw switch $SW_1$ to a conventional Q-switch bias supply 30. Switch $SW_1$ is under the control of a conventional control unit 32 which serves to position the switch between a first set of contacts and a second set of contacts. Bias supply 30 is coupled to the first set of contacts, whereas a supply of periodically varying voltage is coupled to the second set of contacts. In practice this switching must be accomplished electronically to attain the necessary speed.

Switch $SW_1$ is switched between the bias supply and the source of periodically varying voltage to sequentially effect Q-switching followed by mode-locking. The bias supply in one embodiment includes the provision of a voltage which, when applied to electrodes 18 and 20, causes the direction of polarization of light propagating in cavity 10 to rotate 90 degrees. This prevents build up of laser oscillation within cavity 10 for a pre-determined period of time which is set depending upon the type of laser utilized, its operating wavelength, etc. Once a sufficient population inversion has been achieved in the gain medium through pumping, the bias voltage is removed from the Q-switch and stimulated emission from the gain medium is allowed to propagate in the laser cavity, such that the laser is said to lase.

In the present invention, the bias supply voltage is not removed, but rather is replaced with a signal capable of providing mode-locking, such that as lasing begins, mode-locking is quickly established.

By way of example, for a typical laser with a gain medium of Nd:YAG pumped by a flashlamp, a sufficient population inversion usually occurs within 150 nanoseconds after pumping. During this build up time, $T_{Qsw}$, modulator 16 is actuated so as to function as a Q-switch to prevent build up of lasing within the cavity. Thereafter, modulator 16 has available a periodically varying source of voltage at a frequency which assures mode-locking. This frequency is such that the intervals between times of zero polarization rotation are equal to the round-trip travel time of a pulse of light energy within the laser cavity, and consequently the desired single pulse builds up on successive passes through the amplifier, bouncing back and forth between the end mirrors. Since the configuration of FIG. 1 has a partially transmitting mirror 14 at one end, then a portion of the pulse will exit through the mirror on each bounce, and give rise to the typical mode-locked output consisting of a series of pulses 40 separated by intervals of 2L/c. The spectrum of such a series is a comb 36 of lines spaced apart by c/2L about the center frequency of the laser. Mode-locking refers to the maintenance of a fixed phase relationship, with respect to time, of the oscillating laser frequencies corresponding to the longitudinal modes of the resonant laser cavity. The successive reinforcement of the modulation effect causes all longitudinal modes to couple together with a well-defined amplitude and phase.

For Q-switching the direction of polarization is rotated by 90 degrees to effect complete extinction at polarizer 22. Mode-locking may also utilize a full 90 degrees rotation. However, as illustrated in the graph at bottom of FIG. 1, the amplitude of the voltage applied to the modulator for mode-locking may be such as to induce polarization rotations of less than 90 degrees and yet is effective to produce a mode-locked output. The required voltage amplitude will depend upon the details of the laser. In a resonator free of back-reflection from the various intra-cavity elements, a voltage amplitude equal to ten percent of the extinction value is sufficient.

Figure 2:
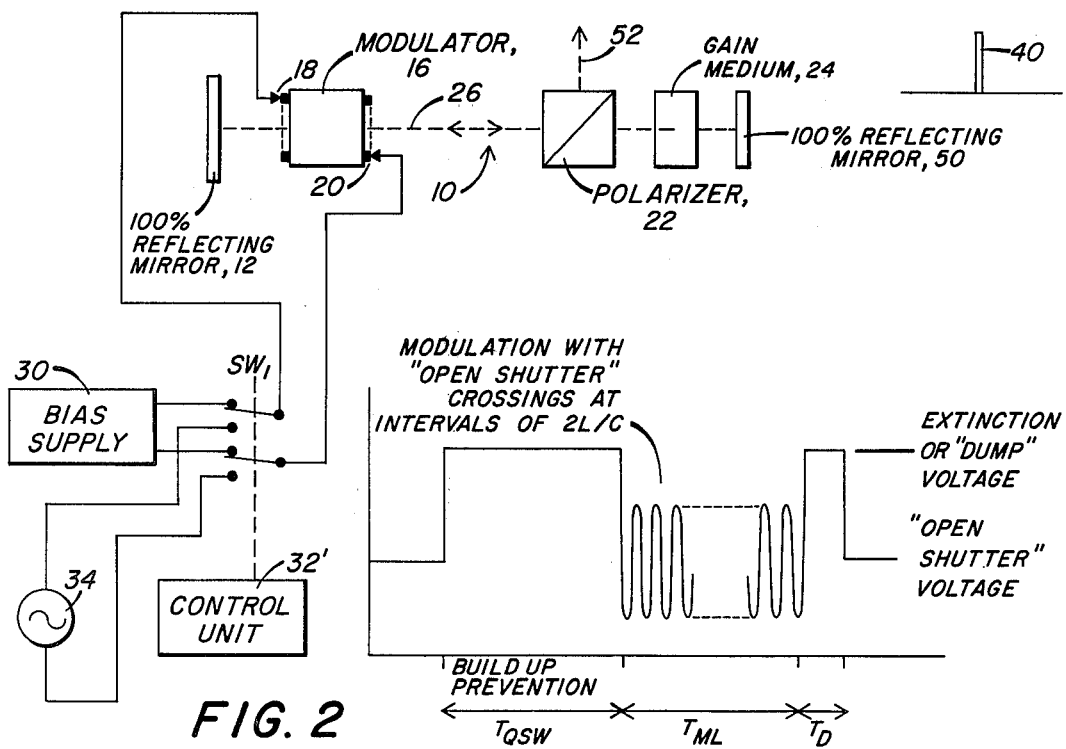
FIG. 2 is a schematic and block diagram of the subject system utilizing a single device for Q-switching, mode-locking and dumping all produced by the same physical effect.

As illustrated, pulses 40 are produced as an output signal. The length of each pulse is generally on the order of one nanosecond, with an interpulse spacing of 5–10 nanoseconds. Typically, the mode-locking voltage is applied to modulator 16 during about 500 nanoseconds, which encompasses the time in which the pulses are developed. This time period is labeled $T_{ML}$. After this time, the gain of the active beam is exhausted, and it no longer matters what voltage is applied to the modulator, provided that the voltage is restored to the extinction value in readiness for the next cycle. Referring now to FIG. 2, the present invention results in the dumping of the single pulse of energy that circulates within the cavity as a result of the Q-switching and mode-locking. The only difference in this configuration over that of FIG. 1 is that a 100 percent reflecting mirror 50 is substituted for partially reflecting mirror 14 of FIG. 1. The remainder of the elements which are common between FIGS. 1 and 2 carry like reference characters.

It will be appreciated that control unit 32' is different from unit 32 insofar as there is a subsequent dumping mode in which a short bias pulse is applied to the modulator such that radiation propagating in cavity 10 will be directed by polarizer 22 in the direction of arrow 52. The dump pulse duration $T_D$ is such that the "dump" or extinction value is achieved at one time interval of 2L/c from the prior "open-shutter" value. Again, the build-up of lasing energy within the cavity is initially prevented by biasing the modulator with a voltage such that light is rejected at polarizer 22. Lasing is initiated by switching to a periodically modulated voltage such as that available at 34. This allows the build-up of a single pulse traveling back and forth in the cavity. However, since both mirrors are fully reflecting, the energy will be contained within the cavity. When the pulse has built up to its maximum value, the voltage on the modulator is rapidly switched back to its initial value, with the result that the pulse which has now been built up within the laser cavity will be caused to exit via the polarizing element 22. This last switching operation is important since it must commence just after one pulse has passed through the modulator, and must be completed before the pulse re-enters the modulator on the next trip.

Figure 3:
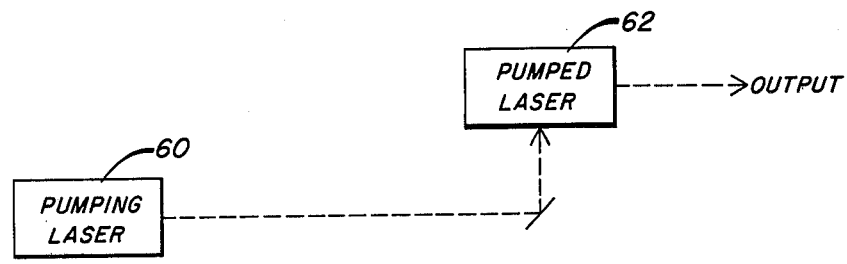
FIG. 3 is a block diagram of a laser-pumped-laser embodiment.

Refrring now to FIG. 3, in a laser-pumped-laser application the preceding can be applied to a laser pumped laser 62. When a single pulse output is required from the overall system, the pumped laser is given the configuration of that shown in FIG. 2. The pumping laser 60 may also be mode-locked and may be given the configuration shown in FIG. 1. It will be appreciated that any combination of the FIG. 1 and FIG. 2 embodiments is possible and is within the scope of this invention.

Figure 4:
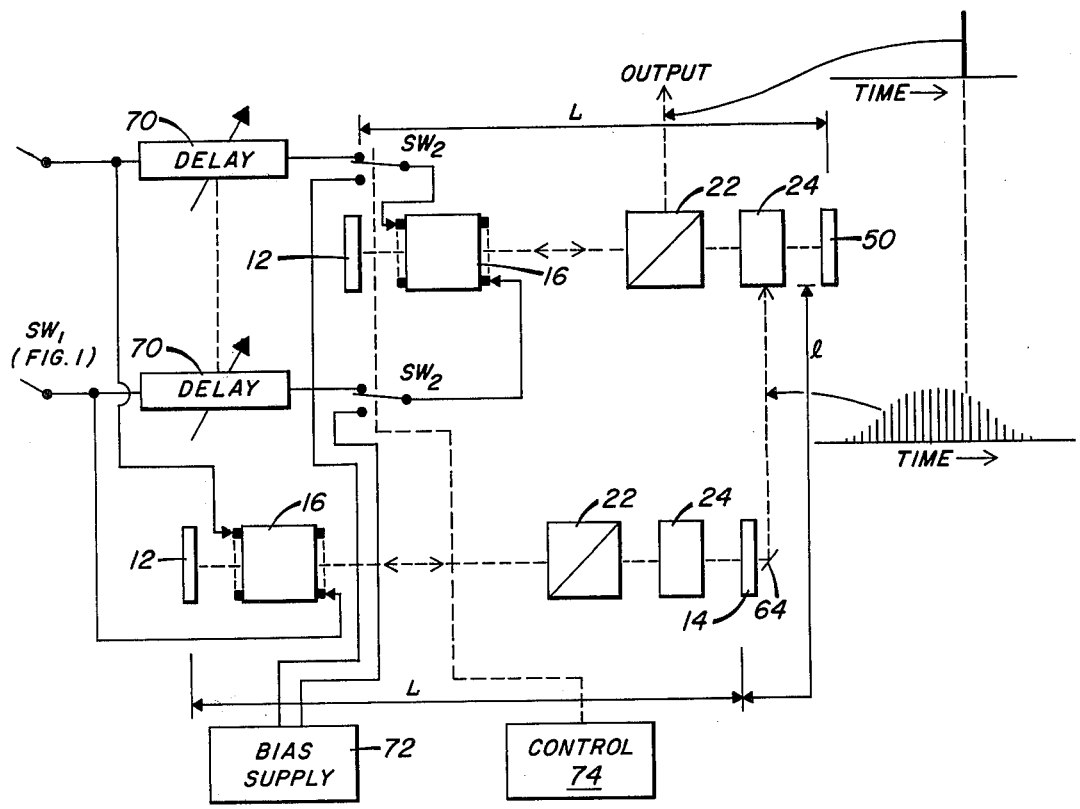
FIG. 4 is a more detailed diagram of the FIG. 3 embodiment.

The above arrangement is illustrated in FIG. 4 in which like elements between FIGS. 1 and 2 are given like reference characters. In the illustrated embodiment of FIG. 4, the light output from partially reflecting mirror 14 is redirected into the gain medium 24 of the pumped laser, by utilization of a mirror 64. This configuration is particularly useful when pumping a dye-laser with a Nd;YAG laser.

While it might be thought that mode-locking of both lasers is redundant, experience with mode-locking systems is that it is sometimes difficult to reliably obtain mode-locking on every pulse. This is particularly so if the radiative lifetime of the pumped laser approaches or is less than the transit time 2L/c of the pumped laser. By actively mode-locking both lasers, reliability is appreciably improved. The pumping laser will generate a sequence of perhaps twenty mode-locked pulses, each lasting approximately a nanosecond or less, and separated by the round-trip time through the laser cavity which is typically between 5 and 10 nanoseconds. The envelope of the pulse would be the typical Q-switch-type envelope with perhaps 150 nanoseconds full width at half maximum height. This train of pulses is then used to pump the active medium in the pumped laser.

For the system to function correctly, the round-trip time of the cavity in the pumped laser must be matched to that of the first. The repetitive pumping by the train of pulses will tend to induce a single laser pulse to build up within the pumped laser, which will traverse the gain medium simultaneously with a pump pulse on each pass. Hence, even without the active mode-locking within the cavity of the pumped laser, there will be a tendency for its output to be mode-locked.

With the added effect of the active modulator, the mode-locking will be certain. If a modulator is utilized in the pumped laser, it is to be modulated with a period matched to that of the modulator in the pumping laser, as well as to the cavity round-trip time which is the same for each of the two cavities. In addition, the phases of the modulation must be appropriately matched to ensure that the systems are acting in unison. The relative phasing takes into account the time of flight of light between the two resonators over a path L, as well as cable delays. As illustrated, in order to ensure the correct synchronization, the two modulators are driven from the same oscillator with an adjustable phase delay 70. For this purpose, the inputs to delay 70, are the common contacts of switch SW$_1$ of FIG. 1. It will be appreciated that not only will the oscillator phase be adjusted, but also the Q-switching pulses will be delayed appropriately. Thus, the Q-switching in the pumped laser occurs in timed relationship with the Q-switching in the pumping laser. As far as dumping of the pumped laser is concerned, this is controlled separately by applying a bias voltage of appropriate amplitude via switch SW$_2$, under control of a control unit 74. This voltage is supplied by a bias supply 72. Note that all switching must be done electronically to achieve the desired speed.

In the particular configuration that is being described, where the pumped laser is receiving its pumping from a Q-switched laser, the initial Q-switching of the pumped laser will often be redundant. In such a situation, its only purpose is to make sure that any leakage of light from the pumping laser, prior to initial Q-switching of the pumping laser, does not cause premature lasing in the pumped laser. If there is no such leakage, then the initial Q-switching of the pumped laser becomes redundant and may be eliminated. The remaining mode-locking and dumping features with the same device with a single pair of electrodes is thus an additional feature of this invention.

In any of the configurations described, the polarizing element 22 may be configured such that the light is rejected from the laser cavity when the modulator 16 is not actuated, and retained within the cavity when it is fully actuated. The signals applied to the modulation are then altered in an obvious way such as to bring about the effects described. This variation is an included feature of the invention.

The invention is not to be limited by what has been particularly described except as indicated in the appended claims.

What is claimed is:

1. In a laser having a resonant cavity and a gain medium disposed therein, apparatus for AM mode-locking, Q-switching and cavity dumping said laser comprising:
    a polarizing element within said cavity;
    a single electro-optical element disposed in said cavity for changing the direction of polarization of light passing therethrough in response to an applied voltage, said electro-optical element having a single pair of electrodes for applying said voltage; and
    means for sequentially applying to said pair of electrodes a d.c. voltage until such time as a predetermined population inversion is achieved in said gain medium, a periodically varying voltage sufficient to effect mode-locking, and a subsequent voltage to said electrodes sufficient to effect cavity dumping.

2. The apparatus of claim 1 wherein said means for sequentially applying the subsequent voltage includes means for reapplying a voltage after the application of said periodically varying voltage for a predetermined period of time which permits one pulse of energy within the cavity to be dumped from said cavity.

3. The apparatus of claim 1 wherein a beam of light travels in said gain medium and wherein said periodically varying voltage applying means applies said periodically varying voltage until such time as the gain of the beam of light in said gain medium is exhausted.

4. The apparatus of claim 1 wherein said means for applying said d.c. voltages applies said d.c. voltage at a level which assures that a 90 degree rotation of polarization is achieved in said electro-optical element.

5. The apparatus of claim 1 wherein said means for applying said periodically varying signal applies said periodically varying signal at a level which is less than that which would produce 90 degree polarization rotations of light passing through said electro-optical element.

6. A method of mode-locking a laser having a resonant cavity, and within the cavity a gain medium, a polarizer element and means for rotating the polarization of light within the cavity, comprising periodically rotating the light within the cavity by amounts significantly less than 90 degrees at a frequency related to the travel time of a pulse of light within the cavity, whereby only partial modulation of the light within the cavity effectively establishes mode-locking.

7. A laser-pumped-laser system comprising:
    a pumping laser having a resonant cavity and within said cavity a gain medium, a polarizing element, and a single electro-optical element for changing the direction of polarization of light passing therethrough in response to an applied voltage, said element having a single pair of electrodes for applying said voltage;

a pumped laser having a resonant cavity, a gain medium, a polarizing element and a similar electro-optic element;

means for injecting the output of the pumping laser into the gain medium of the pumped laser;

means for applying a d.c. voltage to the electro-optic elements in both lasers suitable for Q-switching both lasers and for removing said d.c. voltage; and means for applying a periodically varying signal to the electro-optic elements in both lasers after said d.c. signal has been removed, with the periodically varying signal applied to the pumped laser being delayed by an amount to compensate for the time it takes for light from the pumping laser to reach the gain medium of the pumped laser.

8. The laser-pumped-laser system of claim 7 wherein the cavity of said pumped laser includes 100 percent reflecting mirrors at either end thereof, and further including means for applying a voltage to the electro-optical element in said pumped laser for a time significant to effect dumping of a single pulse from the cavity thereof after mode-locking has been established in said pumped laser.

9. A method for Q-switching, mode-locking and cavity dumping a laser comprising:

using at one location in the laser cavity polarization rotation of light traveling in the cavity of the laser for first Q-switching and then mode-locking and then cavity dumping, whereby all effects are achieved through one physical phenomenon operating at one location in the laser cavity.

10. A laser-pumped-laser system comprising:

a pumping laser having a resonant cavity and within said cavity a gain medium, a polarizing element, and a single electro-optical element for changing the direction of polarization of light passing therethrough in response to an applied voltage, said element having a single pair of electrodes for applying said voltage;

a pumped laser having a cavity, a gain medium, a polarizing element and a similar electro-optic element;

means for injecting the output of the pumping laser into the gain medium of the pumped laser;

means for applying a d.c. voltage to the electro-optic elements in at least the pumping laser suitable for Q-switching the pumping laser; and means for applying a periodically varying signal to the electro-optic elements in both lasers after said d.c. signal has been removed, with the periodically varying signal applied to the pumped laser being delayed by an amount to compensate for the time it takes for light from the pumping laser to reach the gain medium of the pumped laser.

* * * * *